No. 857,497. PATENTED JUNE 18, 1907.
T. L. TAYLOR.
LAUNDRY MARKING MACHINE.
APPLICATION FILED SEPT. 26, 1904.
10 SHEETS—SHEET 9.
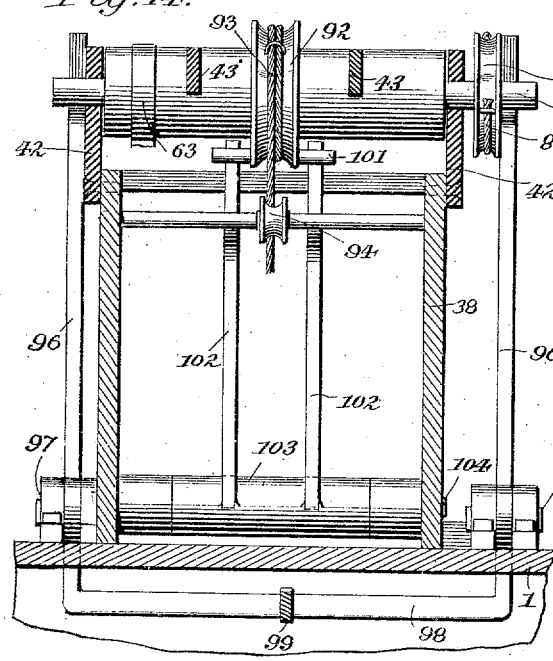
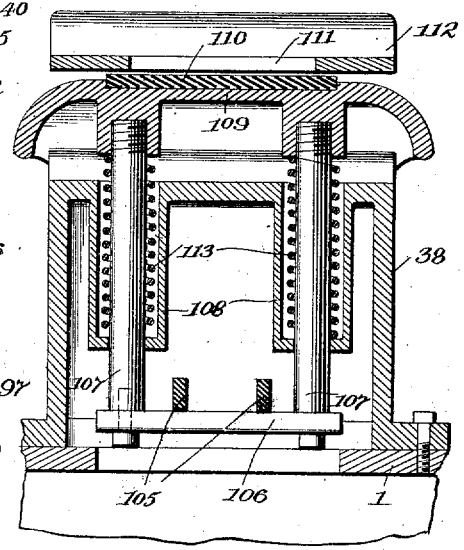
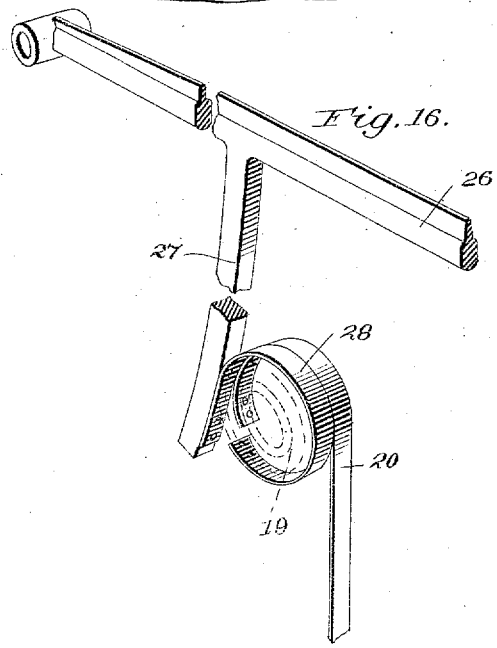
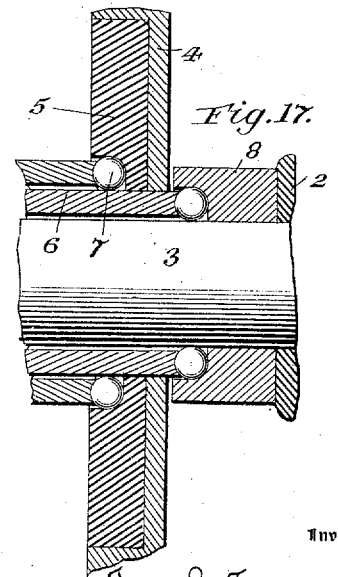
Witnesses
Inventor:
Tom L. Taylor,
By
Attorneys No. 857,497. PATENTED JUNE 18, 1907.
T. L. TAYLOR.
LAUNDRY MARKING MACHINE.
APPLICATION FILED SEPT. 26, 1904.
10 SHEETS—SHEET 10.
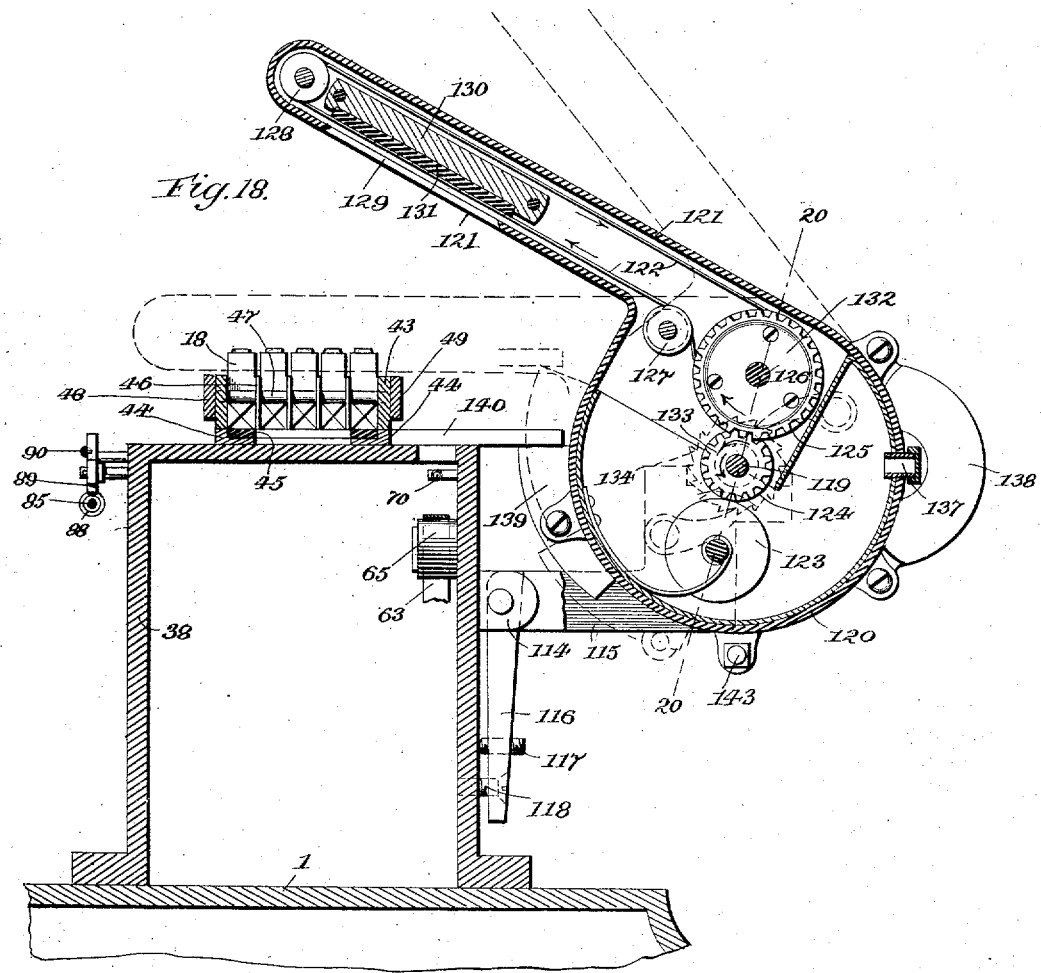
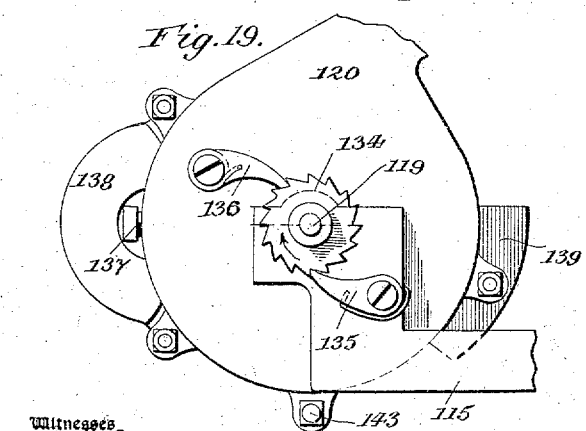
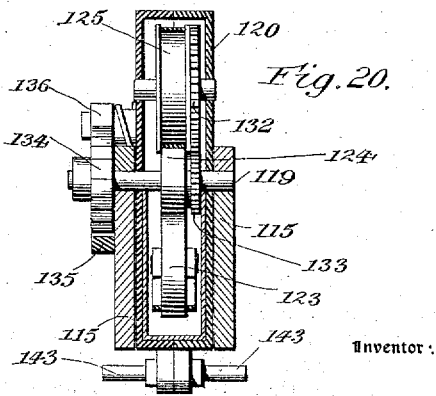
Inventor:
Tom L. Taylor,
By Dodge and Sons
Attorneys
Witnesses

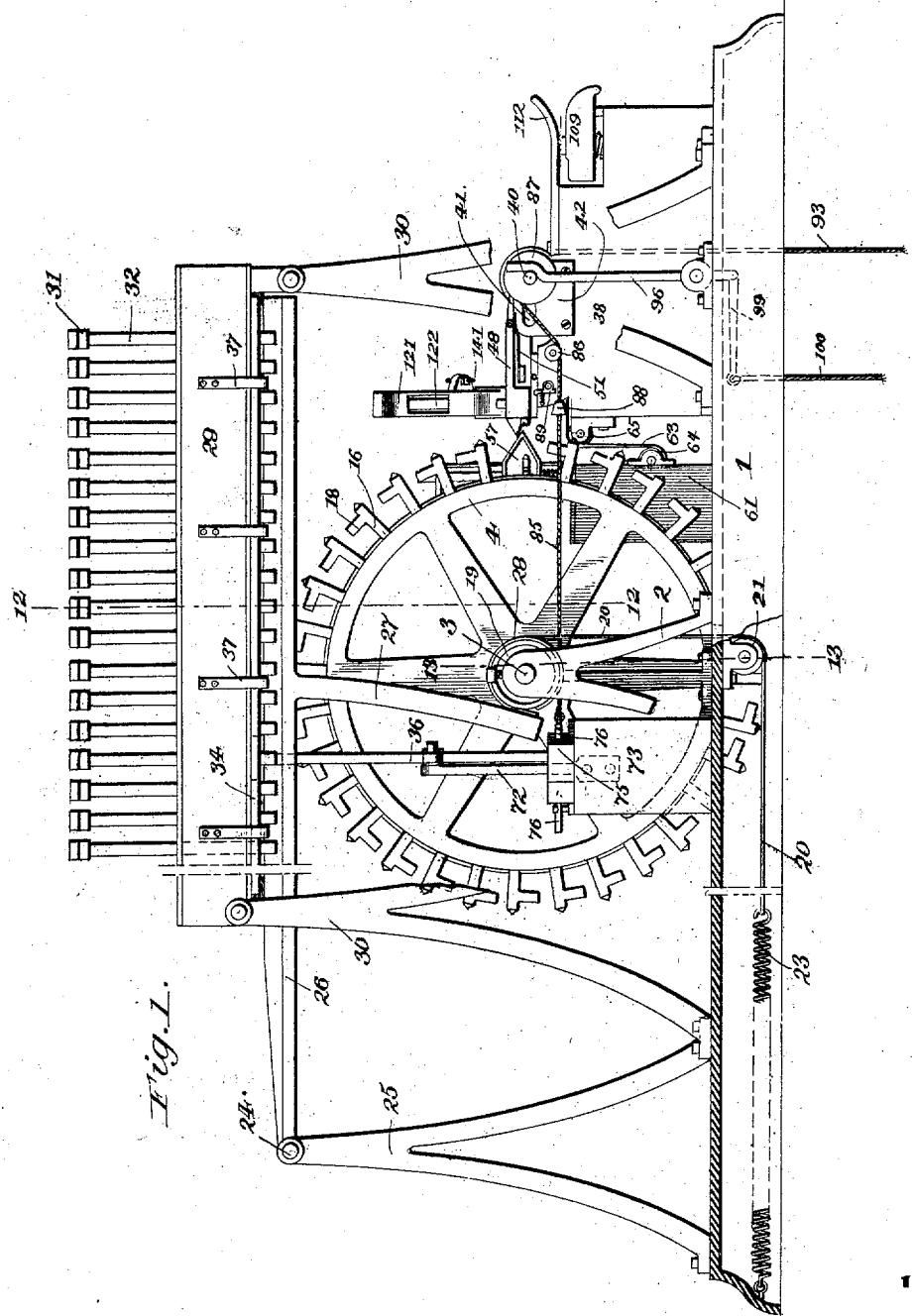

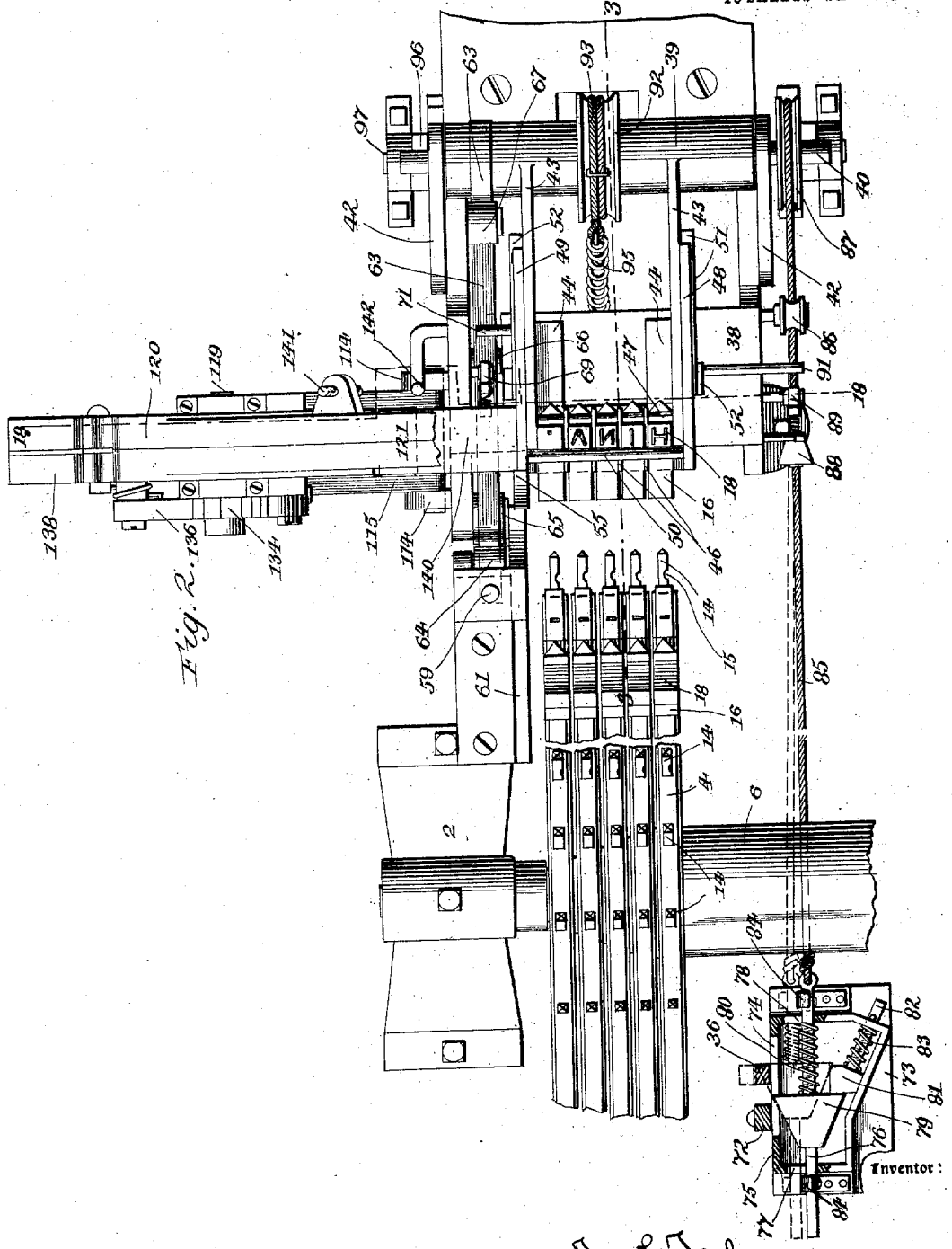

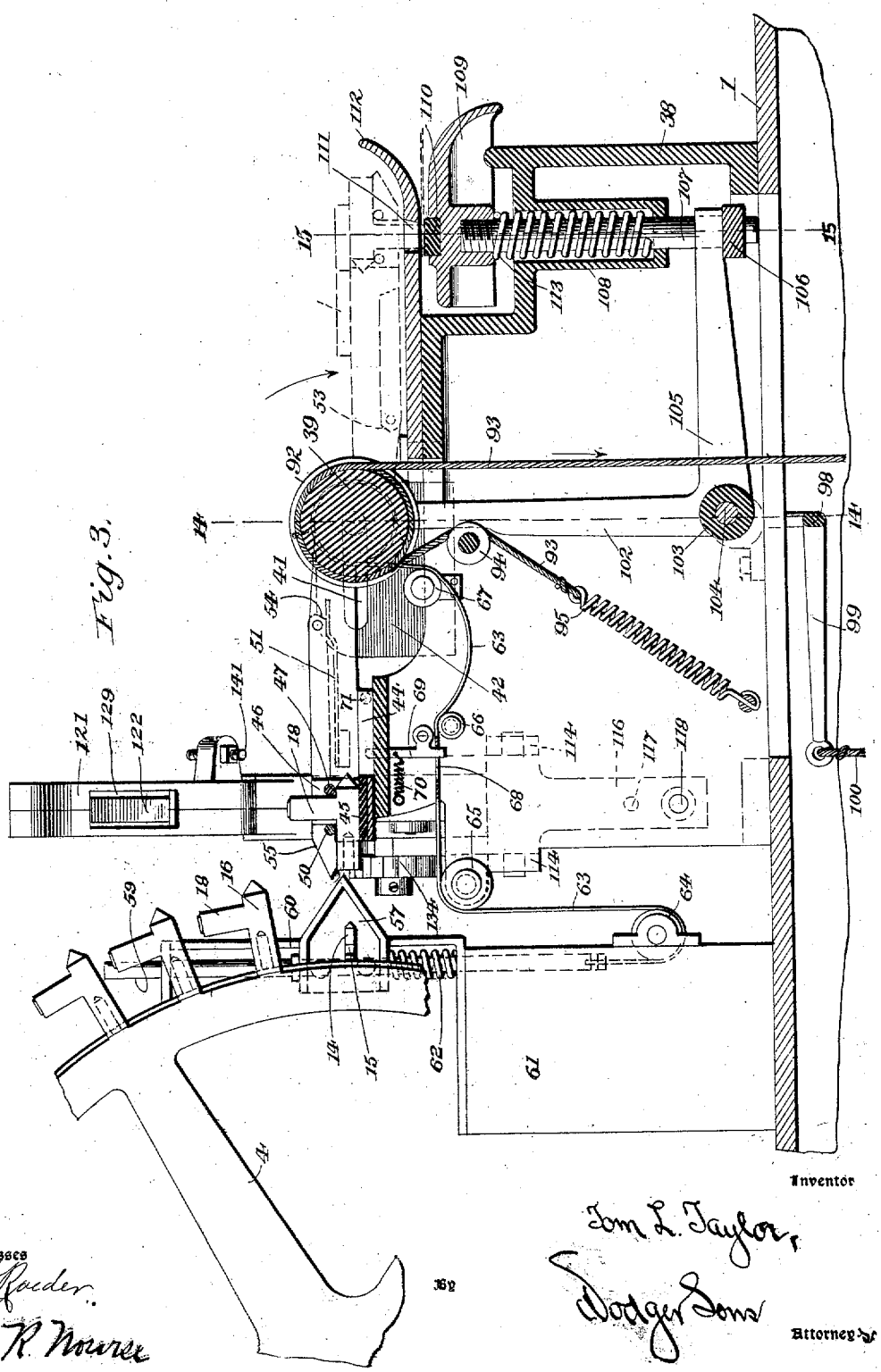

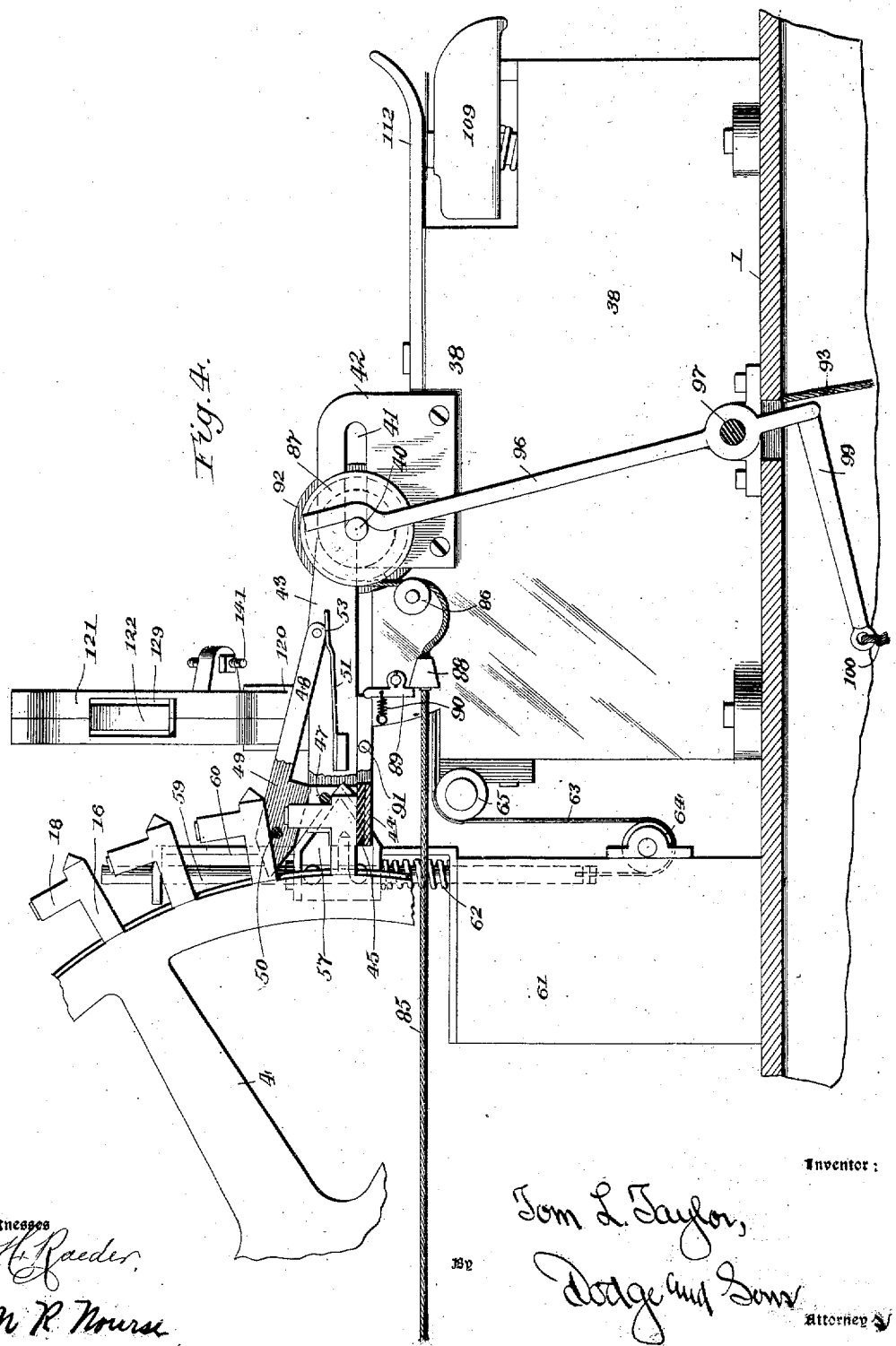

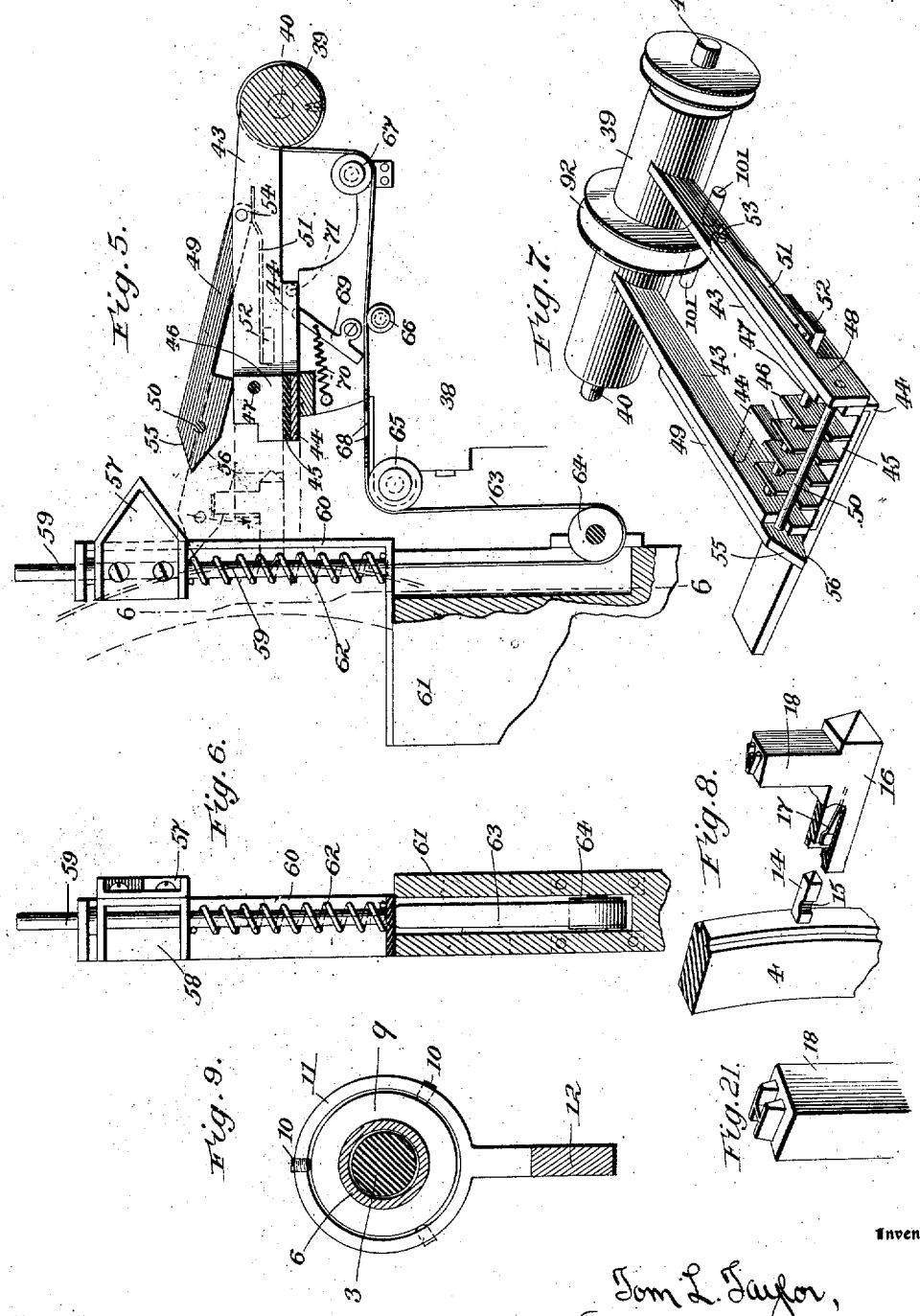

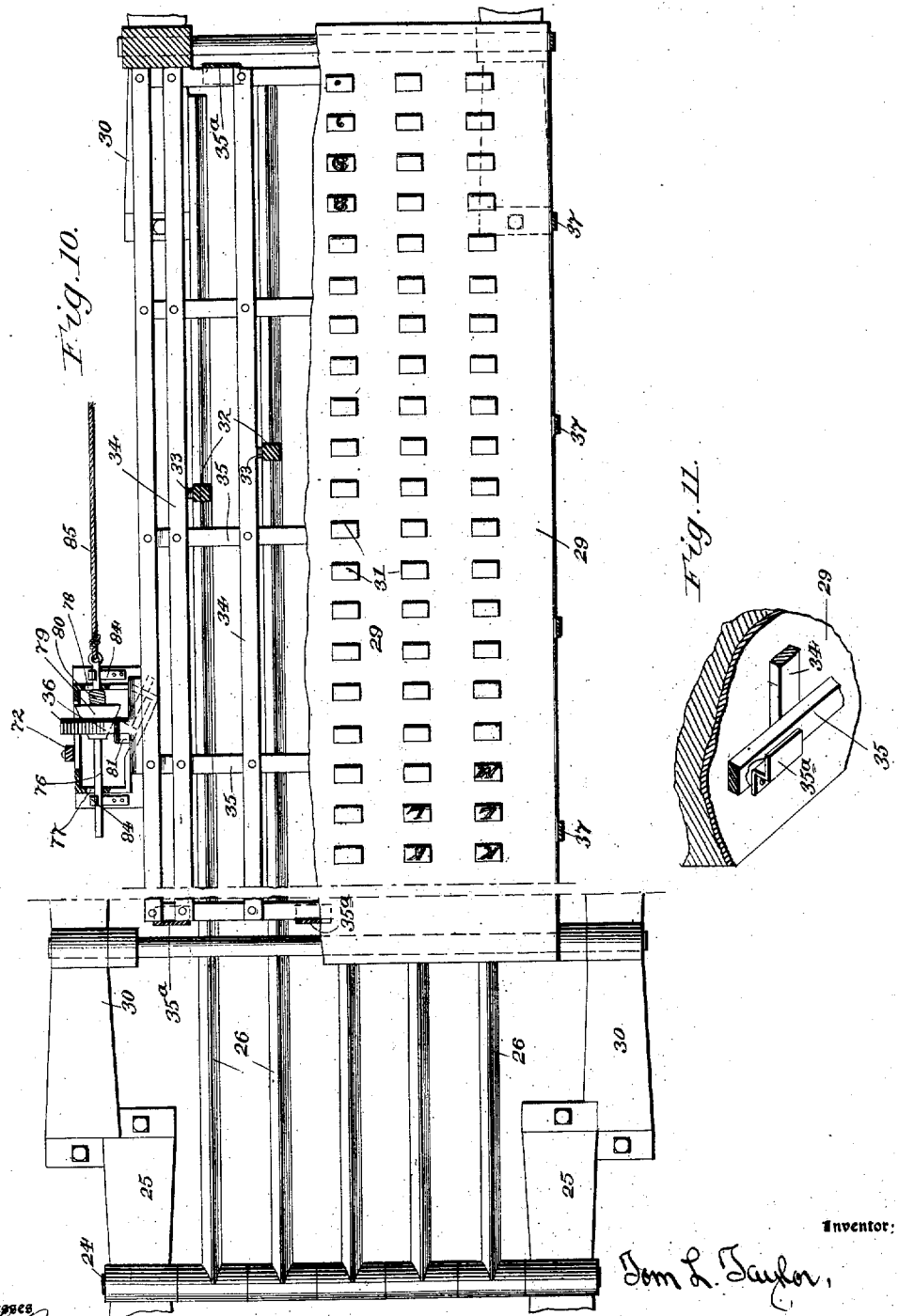

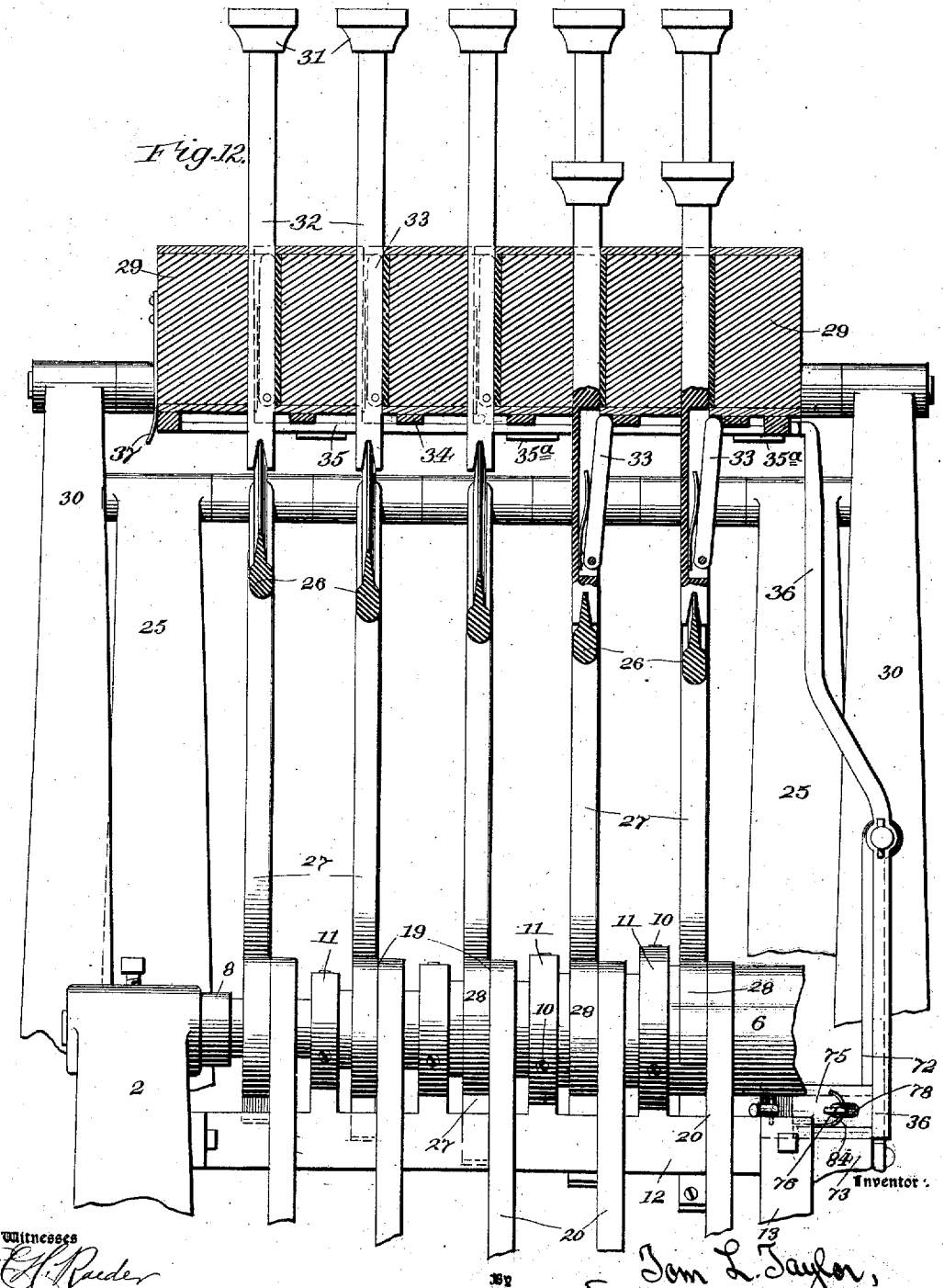

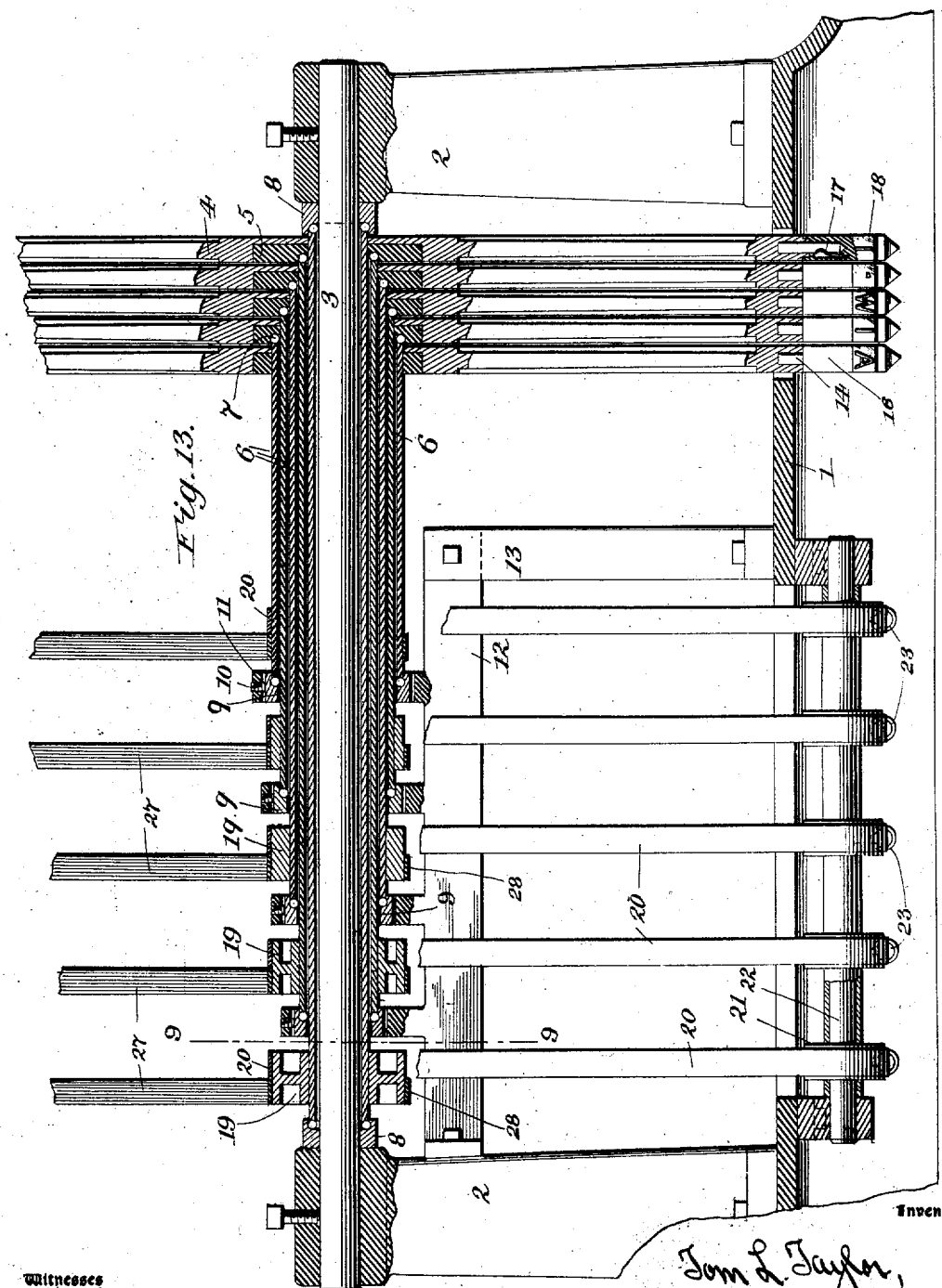

UNITED STATES PATENT OFFICE.

TOM L. TAYLOR, OF ATLANTA, GEORGIA, ASSIGNOR TO THE PEARL LAUNDRY MACHINERY COMPANY, OF ATLANTA, GEORGIA, A CORPORATION OF GEORGIA.

LAUNDRY MARKING-MACHINE.

No. 857,497.  Specification of Letters Patent.  Patented June 18, 1907.

Application filed September 26, 1904. Serial No. 226,064.

*To all whom it may concern:*

Be it known that I, TOM L. TAYLOR, a citizen of the United States, residing at Atlanta, in the county of Fulton and State of Georgia, have invented certain new and useful Improvements in Laundry Marking-Machines, of which the following is a specification.

My present invention pertains to improvements in laundry-marking machines, the construction and advantages of which will be hereinafter set forth, reference being had to the annexed drawings, wherein:

Figure 1 is a side elevation of the machine, parts being broken away to more clearly illustrate the structure; Fig. 2 a top plan view with the key-board removed; Fig. 3 a longitudinal sectional view of the forward portion of the machine, on the line 3—3 of Fig. 2, the chase being shown with the type therein, ready to print a piece of goods,—see dotted line position,—or ready to be moved rearwardly to replace the type upon the type-carrying wheels; Fig. 4 a side elevation, the chase being moved rearwardly with a view to replacing the type upon the type-carriers or wheels; Fig. 5 a like view, showing the position of the parts when the chase is moved inwardly to receive a new set of type; Fig. 6 a vertical sectional view on the line 6—6 of Fig. 5; Fig. 7 a perspective view of the chase and its attendant parts; Fig. 8 a sectional perspective view of one of the type and a portion of its carrier or wheel; Fig. 9 a transverse sectional view on the line 9—9 of Fig. 13; Fig. 10 a plan view, partly in section, of the key-board and the related parts of the mechanism; Fig. 11 a detail perspective view of the key locking and releasing frame, as seen from below; Fig. 12 a vertical sectional view on the line 12—12 of Fig. 1, the parts being somewhat enlarged; Fig. 13 a similar view on the line 13—13 of Fig. 1; Fig. 14 a like view on the line 14—14 of Fig. 3; Fig. 15 a vertical sectional view of the platen taken on the line 15—15 of Fig. 3; Fig. 16 a perspective view of a portion of one of the actuating levers for the type-wheels or carriers, there being a similar lever for each carrier or wheel; Fig. 17 an enlarged sectional view illustrating the manner in which the type-carriers or wheels are mounted; Fig. 18 a transverse sectional view on the line 18—18 of Fig. 2, showing the inking mechanism; Fig. 19 a side elevation of the lower portion of said mechanism; Fig. 20 a sectional view on the line 20—20 of Fig. 18, and Fig. 21 a perspective view of the type face employed in marking certain classes of goods.

The invention herein described is, in part, an improvement upon the apparatus or mechanism set forth in Letters Patent of the United States numbered 745,302, granted to me under date of November 24th, 1903, one object of this invention being to perfect the machine therein shown in certain details.

A further object of the invention is to provide an improved inking mechanism.

A still further object is to provide an improved mechanism for positioning the desired type in line with the chase, so that the latter may automatically engage the type and remove them from the carriers.

Another object is to provide means for locking the carriers in place and retaining them in such position until the type are returned by the chase, at which time the carriers are released.

It is also an object of the invention to provide an improved platen and clamping device for the goods being marked.

The construction by which these objects are attained, as well as certain other details, and the advantages which result therefrom will be set forth in the following description.

In the drawings, 1 denotes the bed or base of the machine, surmounted by two columns or standards 2, between which is secured a rod or bar 3, see Fig. 13, which forms the support for the type-carriers or wheels 4 and their allied parts. Each type-carrying wheel (with the exception of the innermost) is provided with a cup 5 shrunk into place, the cup and wheel-hub being likewise secured to a hollow sleeve or tubular shaft 6, see Fig. 17, one end of said shaft projecting slightly beyond the face of the wheel and being formed with a seat or groove for the reception of antifriction balls 7. The innermost tubular shaft, or the balls which work in conjunction therewith, has its ends supported between two disks 8, which are carried by rod 3 adjacent to each standard 2, as is best seen in Fig. 13. To support the opposite ends of the other tubular shafts collars 9 are provided, each being formed with a raceway for the antifriction balls against which the ends of the shafts bear. Each collar is held in place by screws 10, see Fig. 9, which extend inwardly through a sleeve 11 formed integral with, or supported by, a cross-bar 12 secured to one of the standards 2 and a standard 13 extending upwardly from the base.

Each of the type-wheels is provided around its periphery with a series of pins or studs 14 extending radially from the wheel, each pin being provided with a notch or recess 15 and with a pointed end, best indicated in Fig. 8. These pins are adapted to receive the type and to hold the same with the exception of such as may be withdrawn therefrom by the chase, in a manner hereinafter set forth.

The type are formed with a body portion 16, the outer end of which is pointed or beveled to insure its proper entrance into the chase, the opposite or inner end being hollow or recessed to receive the retaining pin 14. A spring 17 mounted in the recessed portion serves to retain the type upon the pin, the free curved end of the spring entering the recess or notch 15 when the type is shoved into place. A lateral projection, 18, of the type-body carries the type-face. The type is cut quite deeply with a relatively-narrow or sharp face, the sides inclining inwardly from the body to the face proper. Such a type-face is shown in perspective in Fig. 21, and when inked receives ink not only on its outer or flat face but also on its inclined side faces. The sharp type will penetrate the goods to a limited extent and the ink will be deposited by the flat face and will likewise be drawn down the side faces by capillary attraction. A greater amount of ink is thus deposited upon the goods in a clearly defined letter than could be otherwise done. The ink permeates the fiber of the goods and produces a letter which is permanent yet clear and sharp in outline.

Each of the tubular shafts 6 is provided with a drum 19, a band 20 secured thereto passing beneath a pulley 21 mounted upon a shaft 22 secured to the under face of the bed in line with an opening formed therein.

A spring 23, one for each band, extends from the lower end thereof to a fixed portion of the machine. The springs through the connections just described serve to rotate the type-carriers or wheels forwardly, so as to bring the same to their normal positions.

Fulcrumed upon a bar 24, supported by standards 25, rising from the bed of the machine, is a series of levers 26, one lever for each type-carrier. Each lever is formed with a downwardly-projecting arm 27 and a strap or band 28 extends from the lower end of the arm to and partially about drum 19, said band being wound in a direction reverse of that of band 20. The levers underlie a key-board 29, supported upon standards 30 and a series of keys 31 having downwardly-projecting stems 32 is arranged in line with and directly over each lever, there being a complete set of keys for each lever, each set comprising the same characters as appear upon the type of the corresponding type-carrier or wheel.

Preferably the upper face of each lever 26 is wedge-shaped and the lowermost end of each stem 32 is formed with a corresponding notch in order that the parts may be brought into proper relation. Each stem is provided with a spring-pressed detent or locking dog 33 which, when the key and stem are depressed, projects outwardly beneath the keyboard 29 and locks the key in such position. Two keys are thus shown in Fig. 12.

A key-releasing frame is placed beneath the key-board 29, said frame comprising a series of parallel bars 34 and a series of cross connecting bars 35, the frame being supported by brackets 35$^a$ secured to the key-board 29. The innermost of the bars 34 stand adjacent to the key-stems and serve to release the dogs when the frame is moved laterally by a lever 36, in a manner hereinafter set forth.

When it is desired to set up the name or initials of a party, the corresponding keys are depressed, one key in each line or bank. This will cause the various type-carriers to rotate so that the selected type are brought into alinement with the chase, which is then moved forward to withdraw them from the carriers. As the keys are depressed, they become locked, thus holding the levers down against the action of the springs 23 and maintaining the type-carriers at rest, with the pins or studs 14 in position to again receive the type when they are returned by the chase. Each key of each bank or series has a different action upon its lever, owing to the fact that the keys are located at different distances from the fulcrums of the levers. This differential action causes a greater or less rotation of the type-carriers, and the presentation of the proper letter or character to the chase. When the keys are released, upon the return of the type from the chase, springs 23 cause the type-carriers to rotate in a reverse direction and to come back to their normal position, at the same time raising levers 26 and the keys. Springs 37, secured to the key-board, bear upon the key-releasing frame and tend at all times to move the longitudinal bars away from the key-stems and likewise to throw the upper end of lever 36 outwardly. Such position is indicated in Fig. 12.

Secured upon the forward end of the base or bed 1 is a frame or supplemental bed 38, see Figs. 1, 2, 3, 4, 14 and 15. This frame forms the support for the chase, the inker and platen and their attendant parts. The chase comprises a cross member or bar 39, provided with a pintle 40 at each end, which work in slots 41 formed in brackets or plates 42 secured to the side of the frame 38, arms 43 which extend outwardly at right angles to the axis of said cross member or bar, and a cross-bar or plate 44 which connects the other extremities of the arms 43. Said plate 44 is recessed to receive a cushion or yielding pad 45, upon which rest the division and retaining plates 46. These plates are held in place by a cross-rod 47 which passes through the rear elevated portions thereof, the ends of the rod extending into openings formed in arms 43. A pair of levers 48 and 49 is pivotally connected to arms 43, the levers being secured together near their free ends by a cross or locking bar 50. Said bar, as will be seen upon reference to Fig. 7, extends across the reduced outer ends of arms 43 and also across the similarly formed ends of the division or type-retaining plates 46 when the levers are thrown down into line with the arms. The type when in position are held by the bars 47 and 50 and the plates, the lateral projection 18 of the type-body passing up between said bars, which also rest upon the body portion 16 of the type, thus holding the same firmly in place, as shown in Figs. 2 and 3.

A spring 51 is secured to each arm 43, or projections 52 extending outwardly therefrom, the free ends of the springs bearing against the flat faces 53 and 54 formed at the ends of levers 48 and 49, respectively, the springs serving to hold the levers elevated or depressed according as they bear upon one or the other of the faces 53 and 54. Said springs also serve to throw the levers and cross-bar 50 (which members may be termed the "locking frame") downwardly from their elevated position to the closed position after the frame is moved a slight or limited distance from its extreme point of elevation. This initial movement is secured by means which will presently appear.

The forward end of lever 49 is provided with two reversely-inclined faces 55 and 56, see Figs. 1, 5 and 7, which are designed to coact with a movable, wedge-shaped abutment or actuating-block 57. Said block serves to move the locking frame up or down, according as the block is in its raised or lowered position with reference to said frame, the parts being so arranged that the block stands above the frame when the latter is elevated and the chase is empty (see Fig. 5) and below the same when the chase contains type and also as it is moved inwardly to discharge the type (see Figs. 3 and 4). Block or abutment 57 is rigidly secured to a casting 58, mounted upon and movable with a rod 59, slidable in a bracket 60 secured to a pillar or column 61. A spring 62 encircles the rod and tends normally to elevate the same. To the lower end of rod 59 is secured a band or strap 63, which passes about a pulley 64 attached to the column 61 and also over pulleys 65 and 66 and under pulley 67, mounted on the bed 38, its other end being secured to the cylindrical cross member or bar 39, see Figs. 2 and 5.

An opening 68 (Figs. 3 and 5) is formed in the band, and a locking dog or lever 69 is pivoted upon the bed 38 in line with the strap. A spring 70, attached to the dog above its fulcrum, serves to throw the lower end of the dog into the opening when the strap is drawn forward beneath it, thus holding the strap against retrograde movement and consequently keeping spring 62 under compression, with the abutment or actuating-block in its lowermost position, see Fig. 3. The arrangement of the parts is such that the dog does not lock the band except when the chase is rotated, in whole or in part, about the pintles 40. At such time the band will wind about the cylindrical cross-bar 39, drawing the abutment 57 downwardly and putting spring 62 under compression. In Fig. 3 the parts are shown in the positions which they occupy when the chase has been thrown over once to make an impression and then back to full-line position.

A pin 71 (shown in full in Fig. 2 and in dotted lines in Figs. 3, 5 and 7) carried by the cross-bar 44, stands in line with the upper end of lever 69 and serves to release said lever when the empty chase is moved forwardly or away from the type-carrying wheels, see Fig. 5. In moving inwardly or toward the type-carriers the pin forces the lever downward to a slight extent, the band yielding sufficiently to permit this movement.

The chase, the locking frame and the movable abutment or actuating-block may be said to have the following relative positions: First, when the chase is empty and about to be moved inwardly to withdraw type, the block is elevated and the locking-frame also raised, see full line position Fig. 5, but as the chase is moved inwardly the parts assume the dotted line position shown in said figure, the locking-frame being thrown down by the conjoint action of the lower inclined face of the actuating-block and springs 51; second, the position shown in full lines in Fig. 3, assuming, as above noted, that the chase has been withdrawn from the type-carriers and been fully or partially rotated so as to wind the strap 63 about member 39, drawing down the abutment block and locking the same in such position by the action of dog or lever 69; third, the position shown in Fig. 4, where the chase is moved inwardly toward the carriers to replace the type thereon, at which time the inclined face 56 of the locking frame will ride up the upper inclined face of the abutment 57, thus withdrawing bar 50 and permitting the studs or pins 14 to engage the type. At such time springs 51 will bear upon the faces 53 and 54 of the locking frame and serve to maintain said frame in its elevated position as the chase is withdrawn preparatory to the actuation of a new set or number of keys to bring new type into position to be engaged by the chase. As the chase is moved outwardly, pin 71 releases lever 69, thereby permitting spring 62 to move abutment 57 to its elevated position, where it is again ready to assist in throwing the locking frame down when the chase is moved inwardly to receive the newly-positioned type.

As above noted, the keys remain locked until the type are replaced upon the type-retaining pins 14 and the chase moved away from the carriers, at which time the keys are released by the inward movement of the upper end of lever 36. To effect this, the following construction is employed, which is best shown in Figs. 1, 2, 4, 11 and 12. Lever 36 is fulcrumed upon an arm 72 secured to a post or column 73, the lower end of said lever standing adjacent to a slot 74 formed in one side of a box or casting 75, surmounting column 73. A rod 76, passing through elongated openings 77, 78 in the ends of the box, carries a wedge-shaped block 79, one edge of said block standing in line with slot 74, while a spring 80 which encircles said rod tends to move the rod and block rearwardly.

A deflecting block 81, carried at the inner end of a stem 82, is pressed toward the block 79 by a spring 83, the stem 82 being placed at an angle with reference to rod 76, so that the wedge-block will be deflected laterally or out through the slot as it is moved rearwardly until it passes behind block 81, as shown in Fig. 2. In moving forwardly, the wedge block carries the deflecting block with it, thus moving in a straight line and maintaining its position within the box 75 and consequently not affecting lever 36. Springs 84, Figs. 2, 10 and 12, act upon the rod 76 and normally retain wedge-block 79 within the box.

A cord or wire 85 is attached to the forward end of rod 76, said cord passing beneath a roller 86 and being secured to a pulley or wheel 87 made fast to that pintle 40 which stands in line with the cord. The cord has affixed to it a stop button 88, which is in the form of a truncated cone, the stop acting with a lever 89, drawn in one direction by a spring 90 and moved in the opposite direction by a pin or stud 91, projecting outwardly from the chase in line with the upper end of the lever.

As the chase is rotated from the position shown in Fig. 1, in which it is represented as just having taken a new set of type from the carriers, cord 85 is wound about the wheel 87 and the wedge-shaped block 79 is drawn forward without affecting lever 36. The lever 89, however, engages the stop button and holds the parts in this position until the chase is again moved bodily to the rear to discharge the type, at which time pin 91 trips said lever 89 and frees the cord, permitting block 79 to move rearwardly and outwardly, thereby actuating lever 36 and through it the key-releasing frame. It will thus be seen that as the new set of type withdrawn by the chase are brought into use, the mechanism for actuating the key-releasing frame is properly positioned so that it may act or become effective upon the return of the type to the carriers by the chase.

Cross-bar or member 39 of the chase is provided at its midlength with a pulley or pulley-shaped member 92, a cord or band 93 being passed about the same and secured at one point to said member. One end of the cord passes over a roller or wheel 94 and is attached to a spring 95, secured to a fixed portion of the machine. The opposite end of the cord passes to a foot-pedal or actuating lever, not shown. As will be readily seen, the chase may be reciprocated about its axis by alternately drawing down upon and releasing the cord.

To move the chase bodily in a straight line toward the type-carriers, in opposition to the action of spring 95, which normally holds the pintles 40 at the outer ends of slots 41, levers 96 fulcrumed upon the base 1 at 97 are employed, the upper ends of the levers bearing against the pintles, as best shown in Figs. 4 and 14. The lower ends of said levers, which extend through the bed, are connected by a cross-bar 98, provided with a laterally-projecting arm 99, to which is connected an actuating-cord 100, extending to an actuating treadle, not shown.

Projecting laterally from each side of the pulley-shaped member 92 (see Figs. 3, 7 and 14) are pins or studs 101 against which bear arms or levers 102 extending upwardly from a sleeve or collar 103, journaled upon a shaft 104. Horizontally-disposed arms or levers 105 project from said sleeve, the outer ends thereof bearing upon a cross-bar 106 secured to the lower ends of plungers 107. Said plungers pass up through tubular projections 108 and carry at their upper ends the platen 109, which latter is provided with a yielding block 110, preferably of rubber, which takes the impact of the type, which in the act of printing pass down through an elongated opening 111 formed in a plate 112 secured upon the supplemental bed 38.

Springs 113 tend to hold the platen in an elevated position, where it remains except at such time as the pins 101 come into contact with the upper ends of arms 102 as the chase is thrown back beneath the inker, or into the position shown in Fig. 3, said pins then throwing the arms 102 forwardly, and through the connections just described lowering the platen. The stamped article may then be withdrawn and a new piece inserted. Immediately cord 93 is drawn down in the act of throwing the chase over to make a new impression, arms or levers 102 are relieved of the pressure exerted by pins 101, and springs 113 force the platen up against the goods, firmly clamping it beneath the plate 112.

In laundry-marking machines more or less difficulty has heretofore been experienced in obtaining a proper inking of the type. It is essential of course, that too much ink be avoided, and it is just as necessary that a sufficient quantity be placed upon the type. With type such as herein illustrated and described the inking mechanism, shown in detail in Figs. 2, 3, 18, 19 and 20, is specially effective.

Mounted between ears or lugs 114, extending out from the supplemental bed 38, is a two-armed bracket or support 115, formed with a downwardly-projecting arm 116, which is provided with adjusting screws 117 and 118 by which the relative height of the outer end of the support may be varied as desired. A shaft 119 is mounted in the outer ends of arms 115, said shaft forming the pivotal support for the ink fountain 120 and its projecting arm 121 which latter, when depressed, overlies the type-face in the chase and brings the ink ribbon or carrier 122 into contact therewith,—see dotted line position Fig. 18.

As will be seen upon reference to Figs. 18 and 19, the ink fountain is circular in form and contains a spring-pressed roller 123 in the lower portion thereof. Said roller carries the ink to a roller 124 mounted upon shaft 119, the latter roller in turn depositing the ink upon the ribbon or carrier 122, which passes over a roller 125 mounted upon a shaft 126. The ribbon also passes over a guiding roller 127 and about a pulley 128 at the outer end of arm 121. Said arm is provided with a slot or opening 129 near its outer end, and an abutment or block 130 provided with a yielding face or cushion 131 is secured within the arm in line with the opening 129 but between the two stretches of the ribbon. Shaft 126 carries a gear 132, which meshes with a pinion 133 carried by shaft 119, a ratchet-wheel 134 being likewise mounted upon the outer end of said shaft.

A pawl 135 mounted on the arm or support 115 acts to prevent rotation of the ratchet in one direction, while a second pawl 136 mounted on the inker engages the ratchet and carries the same forward in the direction of the arrow, Fig. 19, when the inker is swung down to ink the type. During a downward movement of the inker the pawl 136 engages ratchet 134, causing shaft 119 and pinion 133 to rotate the pinion in turn causing gear 132 and roller 125 to rotate, thereby carrying the ribbon forward to a slight extent beneath the cushion 131. Upon the upward movement of the inker, pawl 135 holds the ratchet against rotation and the ribbon is consequently held at rest or substantially so. A filling tube 137 is provided for the introduction of ink, and a counterweight 138 is attached to the inker, serving to normally hold it in an elevated position. A block 139, preferably of indurated fiber, is secured to the inker, and an arm 140, carried by the chase, extends out in line with the block and, coming into contact therewith when the chase is swung rearwardly, throws the inker down upon the type. An adjustable pin 141 carried by the inker, acting in conjunction with a stop 142, limits the downward movement of the inker. Pins 143, carried at the lower portion of the inker come into contact with the under face of arms 115 when the inker is thrown to its highest position by the counterweight, or into that position indicated by the upper dotted lines in Fig. 18. When the chase is swung over beneath the inker, arm 140 comes into contact with block 139 and, striking the same with more or less force, throws the inking ribbon into contact with the face of the type. At this moment the parts assume the positions shown in the lower dotted lines of Fig. 18, the block 139 passing out of contact with arm 140 but immediately returning to the full line position, as shown. It will, therefore, be seen that the inker makes a quick and sharp contact with the type-face, sufficiently long, however, to fully ink the face and the inclined sides of the type. In other words, the inker has a rebounding action.

It will be readily appreciated that the apparatus may be varied in many of its details without departing from the spirit of the invention; as, for instance, any suitable locking mechanism other than that shown may be employed for holding the keys depressed and maintaining the type-carriers in position until the type are returned thereto. Again, the inker may be directly actuated, instead of through the chase. A greater or less number of type-carriers may be employed, as desired.

Having thus described my invention, what I claim is:

1. In a machine of the character specified, the combination of a series of type-carriers; means for actuation said carriers to bring the desired type into line; a chase movable toward and from said carriers to receive the type and remove the same therefrom; a locking mechanism to hold the carriers in their adjusted position until the type withdrawn therefrom are returned; and means actuated by the chase to release said mechanism.

2. In a machine of the character specified, the combination of a series of type-carriers; means for actuating the same; a chase movable toward and from said carriers, to receive the type and remove the same therefrom; a locking mechanism to hold the carriers in their adjusted position until the type withdrawn therefrom are returned; and means actuated by the chase upon its return movement to release said locking mechanism.

3. In a machine of the character specified, the combination of a series of type-carriers; a series of keys for each carrier adapted to move the carriers to predetermined positions; means to lock the keys in their actuated positions; a chase movable toward and from the carriers; and means actuated by the chase upon its return movement to release the key-locking means.

4. In a machine of the character specified, the combination of a series of rotary type-carriers; a series of keys for each carrier; mechanism intermediate said keys and the carriers to move the carriers to predetermined positions; means to lock the keys in their actuated positions; a chase movable to and from the carriers; and means actuated by the chase upon its return movement to release the key-locking means.

5. In a machine of the character specified, the combination of a series of rotary type-carriers; a series of keys for each carrier; a lever arranged beneath each series of keys; connections intermediate said lever and the carriers; means for rotating the carriers in a direction opposite to that effected by the downward movement of the keys; means to lock the keys in their depressed positions; a chase movable toward and from said carriers and adapted to withdraw the type therefrom; and means actuated by the chase upon its return movement toward the carriers to release the key-locking means.

6. In a machine of the character specified, the combination of a series of rotary type-carriers; a series of keys for each carrier; a lever arranged beneath each series of keys, said lever being provided with a downwardly-projecting arm; connections intermediate said arm and the corresponding type-carrier; a spring for each carrier tending to rotate the same in a direction opposite to that effected by the downward movement of a key; a locking mechanism designed to hold the keys in their depressed positions; a chase movable toward and from said carriers; and means operated by said chase for effecting the release of the key-locking mechanism upon the return of the chase toward the carriers.

7. In a machine of the character specified, the combination of a series of type-carriers; a series of keys for each carrier; a spring-actuated dog or catch carried by each key and adapted to lock the same when it is depressed to actuate the carrier; a frame slidably mounted in line with said dogs; means for normally holding said frame out of engagement with said dogs; a chase movable toward and from said carriers; and means controlled by the movement of the chase for forcing the frame against the dogs and thereby releasing the same, substantially as described.

8. In a machine of the character specified, the combination of a series of type-carriers; a key-board; series of keys mounted in said board, one series for each carrier; a spring-actuated dog adapted to lock each key in its depressed position; a frame slidably mounted beneath the key-board in line with said dogs; springs normally holding said frame out of contact with the dogs; a lever bearing at one end against the frame; a chase movable toward and from the type-carriers; and means actuated by the chase to move said lever and thus cause the frame to release the dogs, substantially as described.

9. In a machine of the character specified, the combination of a series of type-carriers; a key-board; a series of keys mounted in said board; a spring-actuated locking dog for each key; a frame slidably mounted beneath the key-board in line with said dogs; springs tending normally to hold the frame out of contact with said dogs; a lever pivoted to a fixed portion of the machine, one end of said lever bearing against the frame; a spring-actuated block tending normally to tilt the lever and thus move the frame to release the dogs; a chase movable toward and from the type-carriers; and connections intermediate said chase and the block for withdrawing the block from the lever and holding the same in such position and releasing the block when the chase is moved rearwardly toward the type-carriers, substantially as described.

10. In a machine of the character specified, the combination of a series of type-carriers; a key-board; a series of keys mounted in said board for actuating the carriers; a spring-pressed dog for each key adapted to lock said key in its actuated position; a frame slidably mounted beneath the key-board in line with the dogs; springs tending to move the frame in one direction out of contact with the dogs; a lever pivoted to a fixed portion of the machine and bearing at one end upon the frame; a wedge-shaped block mounted in line with the opposite end of the lever; means for normally holding said block out of contact with the lever; means for forcing the block into contact with the lever as the block is moved rearwardly by its actuating spring; a chase movable toward and from the carriers; a band or cord connected to the chase and to the wedge-shaped block; a locking device adapted to hold the block in its forward position as the chase is withdrawn from the type-carriers; and means to release said locking device as the chase is moved rearwardly toward the type-carriers, whereby the lever will be actuated by the wedge-shaped block and the frame moved into contact with and release the locking dogs of the keys.

11. In a machine of the character specified, the combination of a series of type-carriers; a chase movable toward and from the carriers, said chase likewise having an oscillating movement about its axis; a platen; an inking device; and means carried by the chase for actuating the inking device as the chase is thrown rearwardly away from the platen, substantially as described.

12. In a machine of the character specified, the combination of a chase having an oscillating movement about its axis; a platen; an inker located to one side of the chase; and means carried by the chase for moving the inker down directly upon the type carried by the chase when said chase is swung away from the platen.

13. In a machine of the character specified, the combination of a chase having an oscillating movement about its axis; a platen; an inker pivotally mounted to one side of the chase and normally standing out of line therewith; and means for throwing the inker down directly upon the type as the chase is swung rearwardly away from the platen.

14. In a machine of the character specified, the combination of a chase having an oscillating movement about its axis; a platen; an inker pivotally mounted adjacent to the chase; and means carried by the chase adapted and arranged to throw the inker directly into contact with the face of the type carried by the chase when the chase is swung rearwardly away from the platen, the inker moving in a plane substantially in alinement with the axis of the type, whereby the ink will be applied evenly over the various type, substantially as described.

15. In a machine of the character specified, the combination of a chase having an oscillating movement about its axis; a platen; an inker pivotally mounted to one side of the chase; means for maintaining the inker in a normally elevated position; and an arm extending outwardly from the chase, said arm coming into contact with the inker and moving the same downwardly as the chase is swung rearwardly away from the platen.

16. In a machine of the character specified, the combination of a series of type-carriers; a chase movable bodily toward and from said carriers and likewise capable of being rotated about its axis; a platen; an inker pivotally mounted to one side of the chase; an arm carried by the chase, said arm coacting with the inker to move the same down upon the type in the chase as the chase is rocked rearwardly about its axis away from the platen; and means for oscillating the chase.

17. In a machine of the character specified, the combination of a suitable bed; a series of type-carriers; a chase mounted upon the bed and movable thereon toward and from the type-carriers, said chase being likewise capable of oscillation about its axis; a platen; an inker pivotally mounted upon the bed to one side of the chase; means carried by the chase for depressing the inker; means for oscillating the chase; and means for moving the chase bodily toward the type-carriers, substantially as described.

18. In a machine of the character specified, the combination of a suitable base; a chase pivotally mounted thereon; an inker pivotally mounted at one side of the base and normally held out of contact with the type carried by the chase; means carried by the chase for depressing the inker and bringing the same into contact with the type carried by the chase; and means for varying the position of the inker with reference to the chase.

19. In a machine of the character specified, the combination of a suitable base; a chase mounted pivotally thereon; a bracket adjustably mounted upon one side of the base; an inker pivotally mounted in said bracket; and normally held out of contact with the type carried by the chase and means for rocking the inker and bringing the same into contact with the type carried by the chase, as the chase is moved away from the printing point.

20. In a machine of the character specified, the combination of a suitable base; a chase mounted thereon; an inker pivotally mounted at one side of said base; a ribbon mounted in said inker; means for rocking said inker in a plane substantially in alinement with the axis of the type to bring the ribbon directly into contact with the face of the type carried by the chase; and means for shifting said ribbon.

21. In a machine of the character specified, the combination of a suitable base; a chase pivotally mounted thereon; an inker pivotally mounted at one side of the base; an arm carried by the chase; a block carried by the inker and normally standing in line with said arm; means for normally holding the inker in an elevated position out of the path of travel of the chase; and means to limit the rocking movement of the inker.

22. In a machine of the character specified, the combination of a suitable base; a chase mounted thereon; an inker pivotally mounted at one side of the base, said inker comprising an ink-fountain and an arm extending outwardly therefrom; means for normally holding said arm in an elevated position; means carried by the chase for depressing the inker; an inking ribbon mounted in said inker; means for shifting said ribbon; and a yielding cushion for the ribbon in line with that portion which comes into contact with the type carried by the chase, substantially as described.

23. In a machine of the character specified, the combination of a suitable bed; a spring-pressed platen; a plate overlying the platen and against which it is normally pressed; a printing surface; means for bringing said surface against the material held between the platen and the plate; and means for temporarily separating the plate and platen as the printing surface is withdrawn from the printed material.

24. In a machine of the character specified, the combination of a suitable bed; a chase mounted thereon; means for oscillating said chase without its axis; a plate; a spring-pressed platen mounted below the plate and normally held up toward the same to clamp the article to be printed; and connections intermediate said chase and platen for withdrawing the platen from the goods previously printed as the chase is swung rearwardly to a position in which the type therein may receive ink.

25. In a machine of the character specified, the combination of a suitable bed; a chase mounted thereon; means for oscillating the chase about its axis; a plate; a spring-pressed platen normally held up to the plate to clamp the goods to be marked; connections intermediate said platen and the chase, whereby the platen is lowered as the chase is swung rearwardly; an inker standing in line with the type carried by the chase when said chase is moved rearwardly; and means for depressing the inker when the parts assume the positions just mentioned.

26. In a machine of the character specified, the combination of a suitable bed; a chase mounted upon the bed; means for oscillating said chase about its axis; a spring-pressed platen; connections intermediate said platen and the chase for withdrawing the platen from the goods previously stamped as the chase is thrown to its rearward position; an inker pivotally mounted in line with the type carried by said chase; and means carried by the chase for depressing the inker, substantially as described.

27. In a machine of the character specified, the combination of a suitable bed; a series of type-carriers; a chase mounted upon said bed and movable toward and from the type-carriers; means for automatically locking the type in the chase as it is withdrawn from the carriers; means for oscillating the chase about its axis; a spring-pressed platen clamping the goods to be printed; connections intermediate said platen and the chase to withdraw the platen from the goods as the chase is swung to its rearward position; an inker pivotally mounted in line with the type carried by the chase when the chase is in the position just noted; and means for depressing the inker.

28. In a machine of the character specified, the combination of a suitable base; a series of type-carriers; a chase mounted upon said base and movable toward and from said carriers; means for moving said chase in the direction stated; means for oscillating the chase about its axis, a spring-pressed platen; a plate located above the platen and against which the goods to be printed may be clamped; connections intermediate said platen and the chase for lowering the platen as the chase is swung rearwardly; and an inker adapted to ink the type when the chase is swung rearwardly.

29. In a machine of the character specified, the combination of a suitable bed; a series of type-carriers; means for actuating said carriers; a chase movable bodily toward and from said carriers to remove the type from or replace the same thereon; means for automatically locking the desired type within the chase; means for releasing the type when the chase is moved rearwardly toward the carriers; a spring-pressed platen; connections intermediate the platen and the chase for releasing the platen from the goods as the chase is swung rearwardly; and an inker adapted to make contact with the type carried by the chase when the chase reaches the position just noted.

30. In a machine of the character specified, the combination of a series of type-carriers provided with pins extending radially from the periphery thereof; a series of type, one for each pin; a spring carried by each type and adapted to coact with the pin to normally hold the type in place thereon; and a chase movable toward and from said carriers to remove the type from the carriers, substantially as described.

31. In a machine of the character specified, the combination of a series of type-carriers; series of type carried thereby, the outer end of each type being beveled; a chase movable toward and from said carriers; a pocket formed in said chase adapted and designed to receive selected type from the carriers; and means for automatically locking the type in the chase.

32. In a machine of the character specified, the combination of a series of type-carriers; a series of type mounted upon each carrier; a chase movable toward and from the carriers, said chase being provided with a series of division or retaining plates 46; a cross-rod 47 extending through said plates; and a locking device adapted to engage the type upon the face opposite that against which the rod 47 bears.

33. In a machine of the character specified, the combination of a series of type-carriers; series of type mounted thereon; a chase movable toward and from said carriers to remove the selected type therefrom; a series of division plates 46 carried by said chase; a cross-rod 47 connecting the rear portions of said plates; a locking frame for said type comprising levers 48 and 49 connected by cross-bar 50; and means for automatically throwing said locking frame into position.

In testimony whereof I have signed my name to this specification in the presence of two subscribing witnesses.

TOM L. TAYLOR.

Witnesses:
J. J. THOMASON, Jr.,
A. T. COX.